United States Patent [19]
Eroshenko

[11] Patent Number: 6,052,992
[45] Date of Patent: Apr. 25, 2000

[54] HETEROGENEOUS STRUCTURE FOR ACCUMULATING OR DISSIPATING ENERGY, METHODS OF USING SUCH A STRUCTURE AND ASSOCIATED DEVICES

[75] Inventor: Valentin Eroshenko, Paris, France

[73] Assignee: D L D International a part interest, France

[21] Appl. No.: 08/849,128

[22] PCT Filed: Dec. 6, 1995

[86] PCT No.: PCT/FR95/01609

§ 371 Date: Jun. 6, 1997

§ 102(e) Date: Jun. 6, 1997

[87] PCT Pub. No.: WO96/18040

PCT Pub. Date: Jun. 13, 1996

[30] Foreign Application Priority Data

Dec. 9, 1994 [FR] France .................................. 94 14856

[51] Int. Cl.[7] .............................. F01K 3/00; F01B 31/00
[52] U.S. Cl. .............................. 60/509; 60/512; 60/515; 60/527; 92/134
[58] Field of Search .............................. 60/508, 509, 516, 60/512, 515, 527; 92/130 B, 134; 267/113

[56] References Cited

U.S. PATENT DOCUMENTS

| | | | |
|---|---|---|---|
| 1,920,094 | 7/1933 | Martin, Jr. | .................................. 60/509 |
| 3,486,417 | 12/1969 | Vita et al. | .............................. 92/134 X |
| 4,471,190 | 9/1984 | Pouyez . | |
| 4,945,725 | 8/1990 | Carmein et al. | .......................... 60/509 |

FOREIGN PATENT DOCUMENTS

| | | |
|---|---|---|
| 943444 | 7/1982 | European Pat. Off. . |
| 1333870 | 8/1987 | European Pat. Off. . |
| 1553302 | 1/1969 | France . |
| 943444 | 7/1982 | U.S.S.R. . |
| 1333870 | 8/1987 | U.S.S.R. . |

*Primary Examiner*—Hoang Nguyen
*Attorney, Agent, or Firm*—Nixon Peabody LLP; Stuart J. Friedman

[57] ABSTRACT

The invention relates to a heterogeneous structure for energy accumulation-dissipation (10), the structure being constituted by a porous capillary solid matrix (11) of open capillary porosity and of controlled topology, with capillary passages (12) of varying section and/or mutually interconnected to form labyrinths, and by a liquid (13) surrounding the porous capillary matrix and defining a liquid/solid separation surface, with the matrix (11) being lyophobic relative to said liquid. The area of the separation surface then varies isothermally and reversibly as a function of the external pressure to which the heterogeneous structure (10) is subjected.

19 Claims, 7 Drawing Sheets

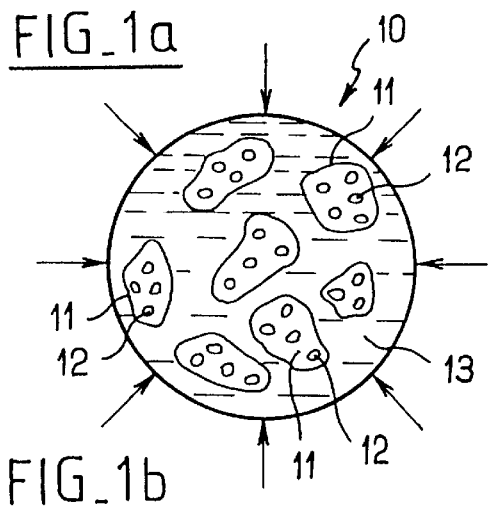
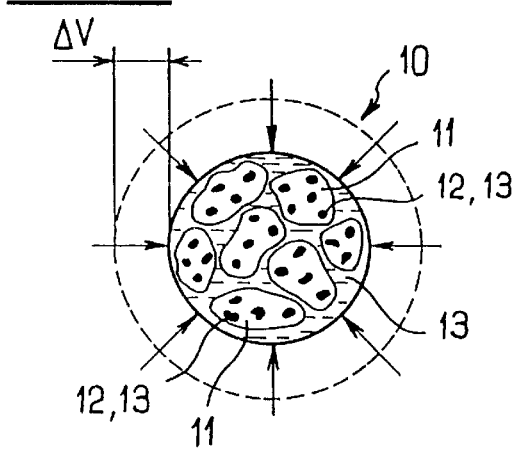
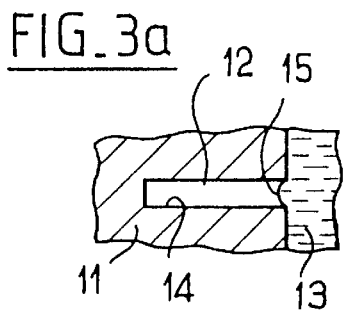
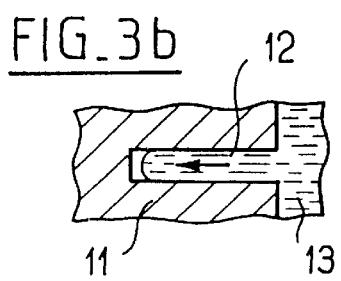
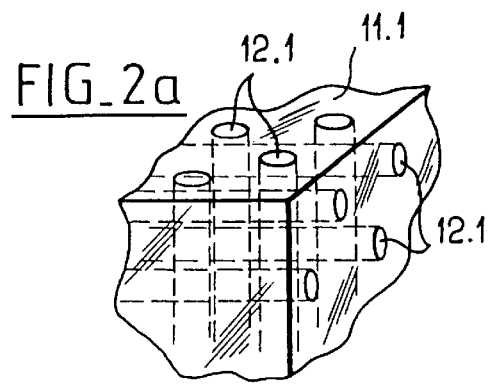
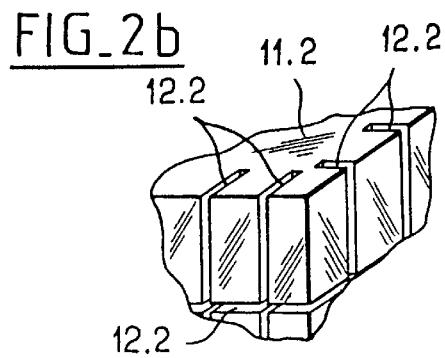
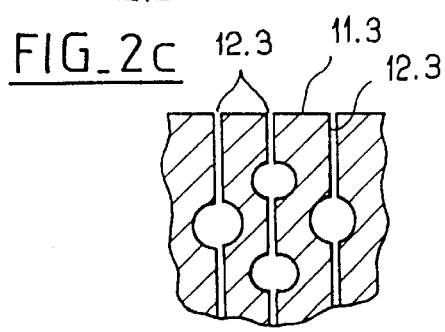
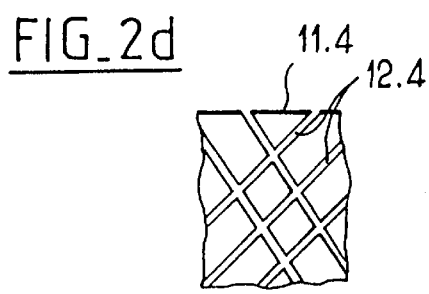
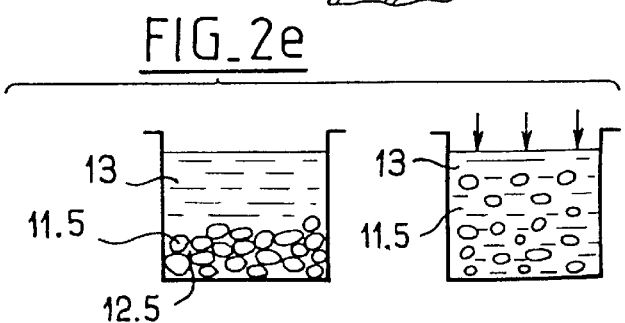

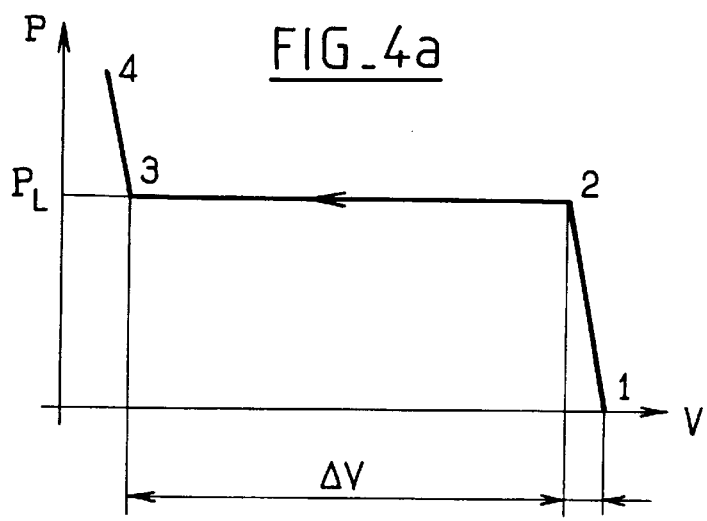
FIG_4a
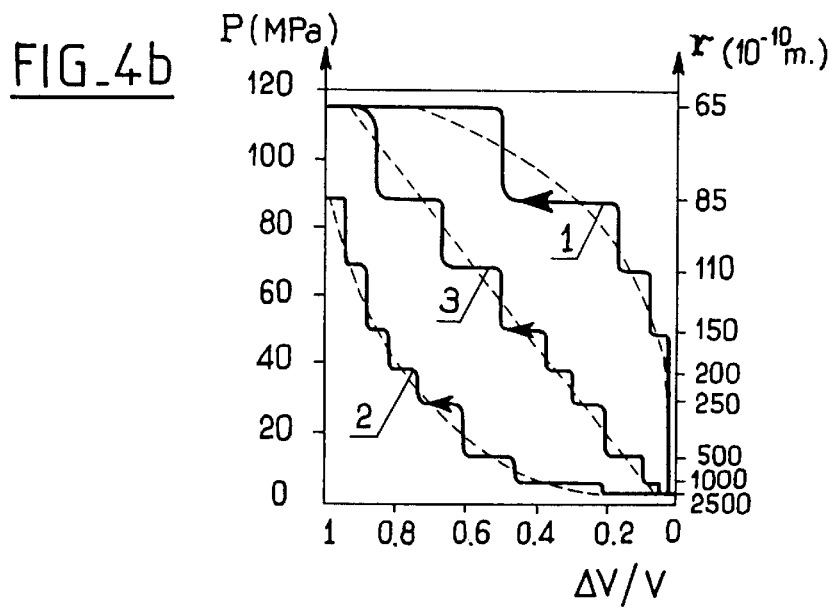
FIG_4b
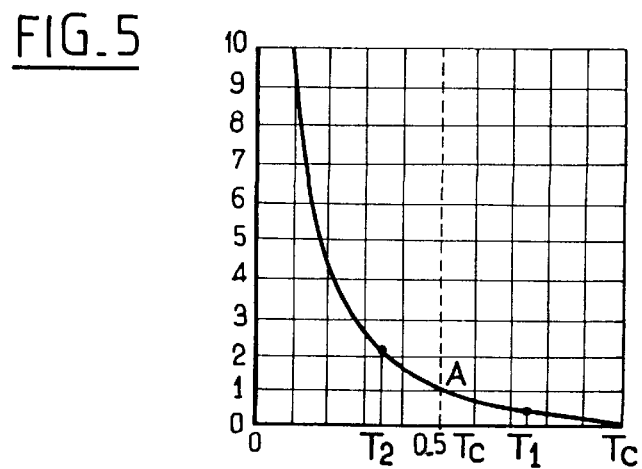
FIG_5

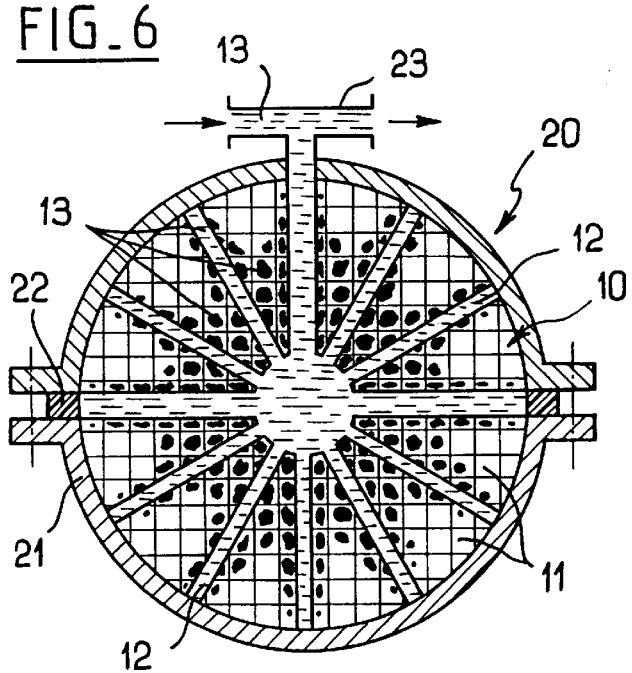
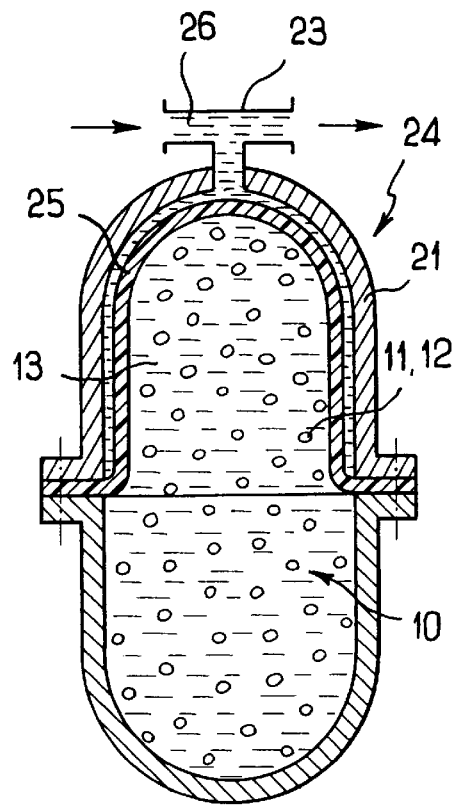
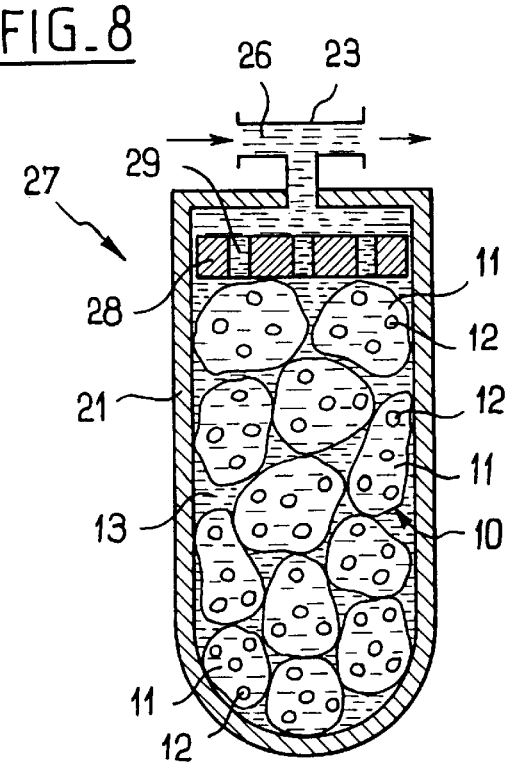

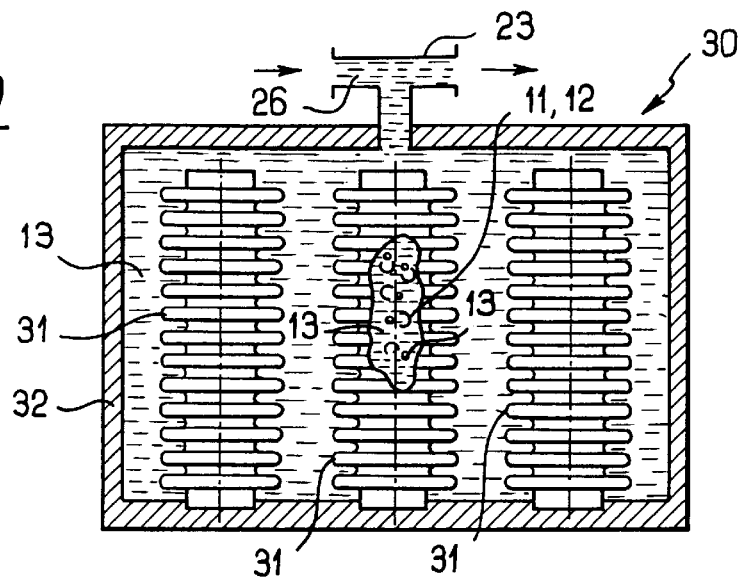
FIG_9
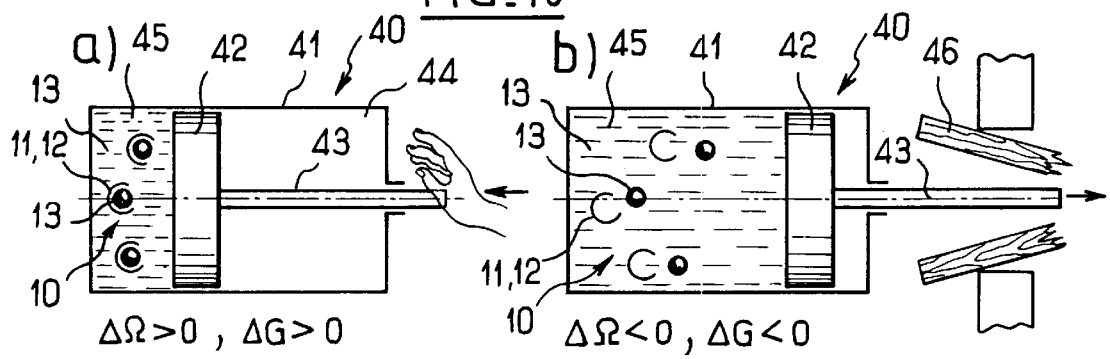
FIG_10
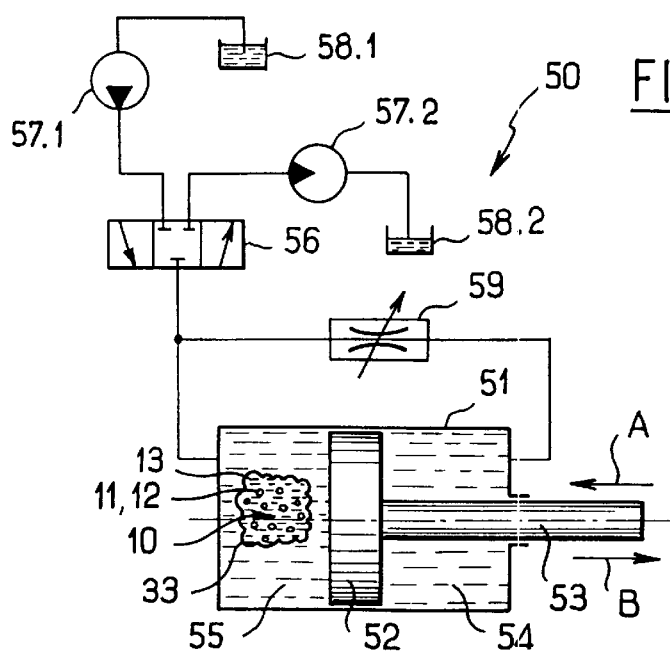
FIG_11

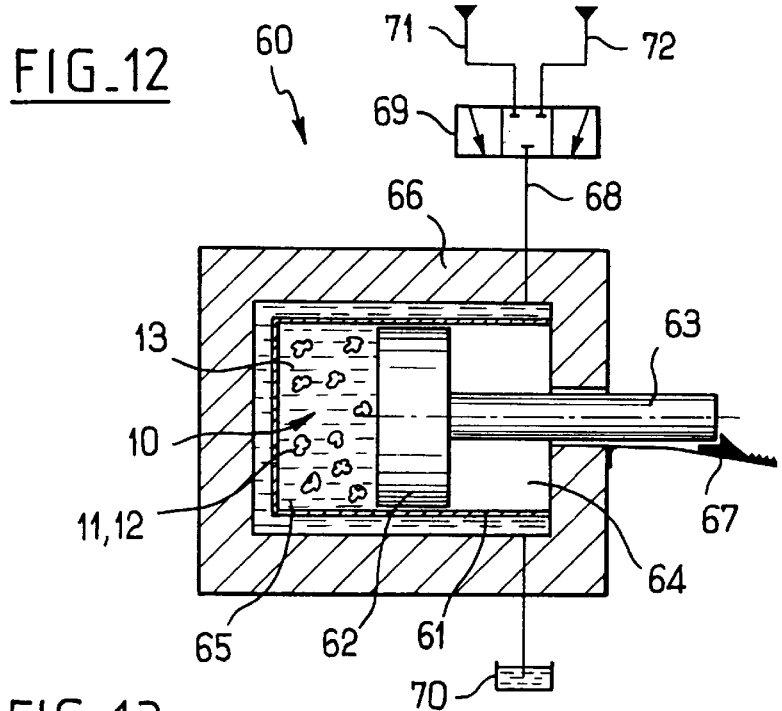
FIG_12
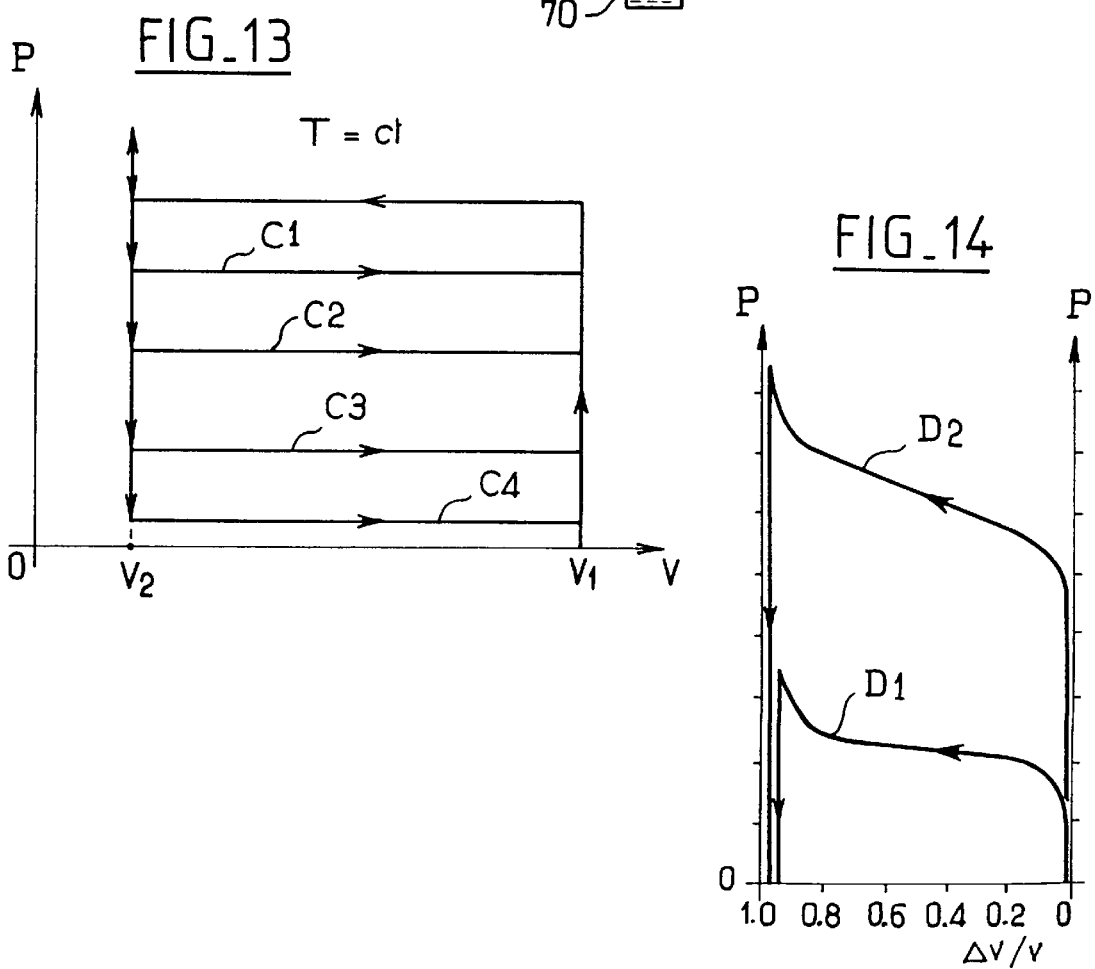
FIG_13
FIG_14

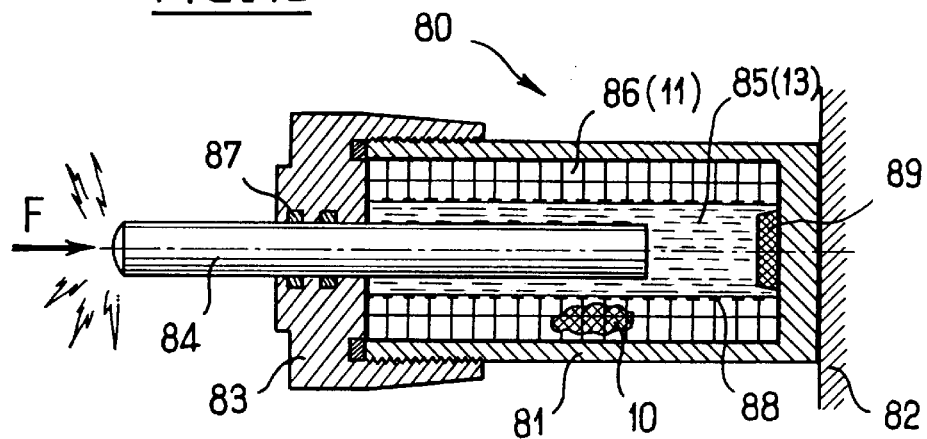
FIG_15
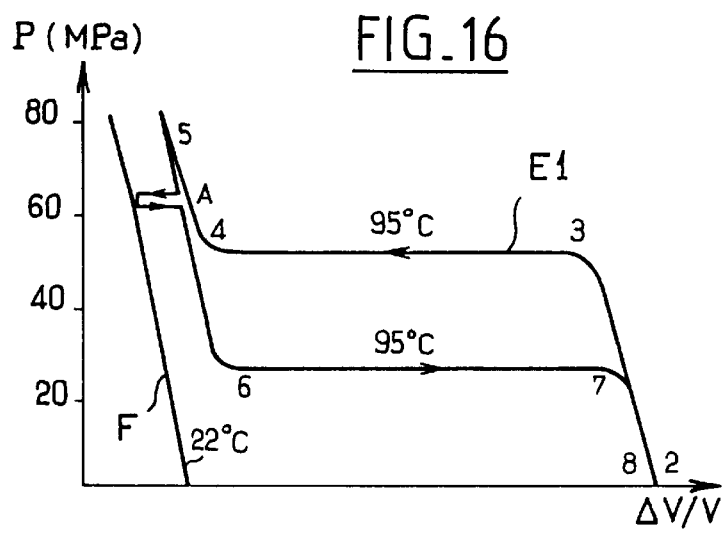
FIG_16
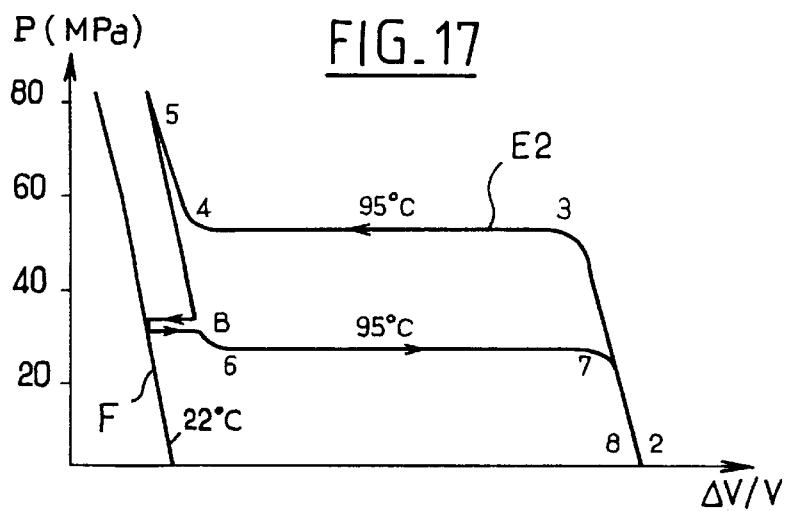
FIG_17

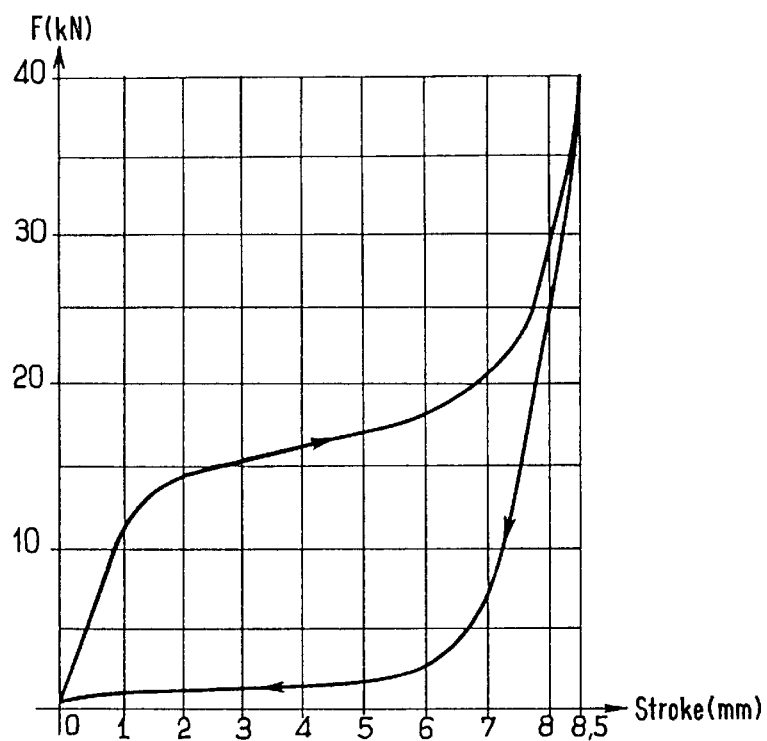
FIG_18
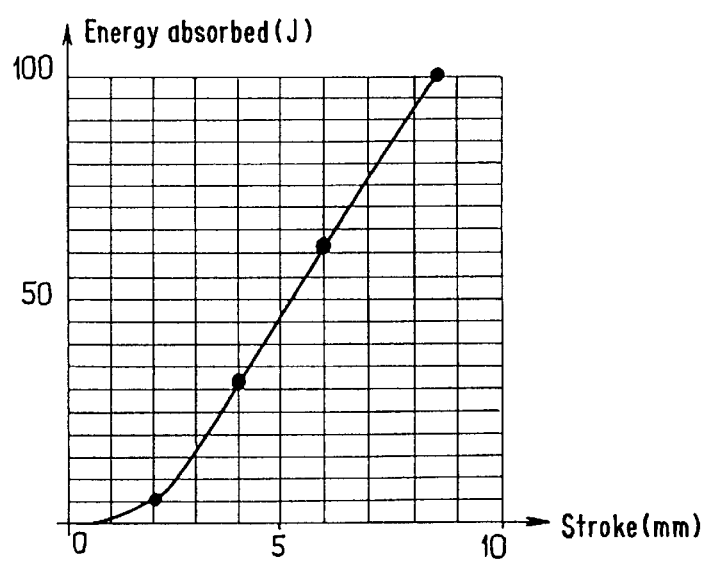
FIG_19
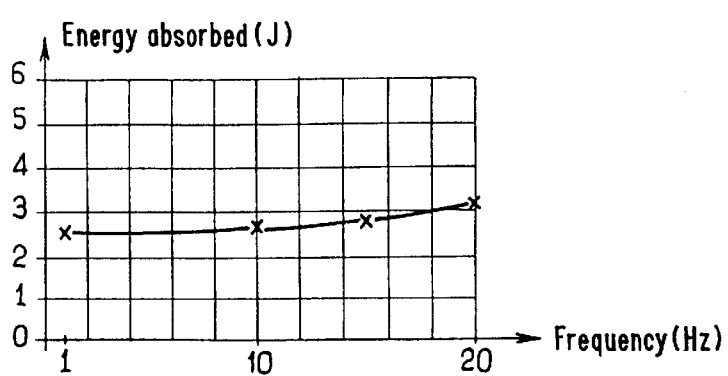
FIG_20

HETEROGENEOUS STRUCTURE FOR ACCUMULATING OR DISSIPATING ENERGY, METHODS OF USING SUCH A STRUCTURE AND ASSOCIATED DEVICES

FIELD OF THE INVENTION

The invention relates to the field of thermodynamics, and more particularly to techniques of accumulating or dissipating energy in association with thermodynamic systems or devices.

The object of the invention is to develop a novel technique of accumulating or dissipating energy that is capable of providing performance that is much higher than that obtained with traditional techniques that make use of conventional working fluids, i.e. gases and steam, for accumulating energy, and ordinary viscous fluids such as those used in shock-absorbers or dampers for dissipating energy.

BACKGROUND OF THE INVENTION

In documents SU-A-1 333 870 and SU-A-943 444, the inventor has described the general principle of an energy-accumulating heterogeneous structure of the type comprising a porous capillary solid matrix that is lyophobic relative to the liquid surrounding said matrix, i.e. the matrix is not wetted by the liquid. Nevertheless, the capillary porosity is defined in theoretical and rudimentary manner in those documents, using capillary passages of constant section. In fact, it turns out that making such a matrix is very expensive, and that the performance of such a heterogeneous structure is limited in terms of the amount of energy that can be accumulated. Also, a matrix of that type turns out to be unsuitable for obtaining significant results when dissipating energy.

OBJECTS AND SUMMARY OF THE INVENTION

The invention thus seeks to devise a heterogeneous structure of better performance, that is capable of implementing a thermodynamically reversible process, and in particular of avoiding heating and/or turbulence during compression.

The invention also seeks to provide methods of using such a heterogeneous structure, and also associated devices implementing the methods.

More particularly, the invention provides a heterogeneous structure for accumulating or dissipating energy for use in thermodynamic systems or devices, the structure being of the type comprising a porous capillary solid matrix and a liquid surrounding said matrix, said matrix being lyophobic relative to said liquid, the structure being characterized in that the porous capillary solid matrix has open capillary porosity and controlled topology, with capillary passages of varying section and/or mutually interconnected to form labyrinths, and the liquid surrounding the porous capillary matrix being selected to define a solid/liquid separation surface whose area varies isothermally and reversibly as a function of the external pressure to which the structure is subjected.

The main criteria used with such a heterogeneous structure are the solid/liquid separation surface area and the surface tension of the liquid at its interface with the solid.

Such an approach, which was merely outlined in above-mentioned documents SU-A-1 333 870 and SU-A-943 444, is thus radically different from the teaching given by conventional thermodynamics insofar as the potential energy of molecular interaction is used, together with the dependence of said energy on temperature. Thus, instead of using the kinetic energy of the random motion of gas or vapor molecules, the argument relates to the potential energy of molecular interaction by causing an appropriate liquid to penetrate into micropassages (whose dimensions lie typically in the range one-thousandth to one-tenth of a micron), allowing the liquid to escape from said micropassages, with a separation surface area that increases as the liquid penetrates and decreases as the liquid withdraws, with this taking place in a process that is both isothermal and reversible. It is then possible to encounter compression of the working medium which is isobaric and isothermal but without phase transition, using as independent parameters the values of temperature and of solid/liquid separation surface area. The energy that is accumulated or dissipated is thus essentially thermomolecular.

In a particular embodiment, the capillary passages are mutually interconnected, and are organized to form cylindrical channels, slightly curved capillaries, or slots, so as to present low hysteresis when the structure is subjected to an isothermal compression-expansion process.

In a variant, the capillary passages are of varying section, and are organized in the form of intersecting channels, or of channels comprising alternating microspheres and neck portions, thereby presenting high hysteresis when the structure is subjected to an isothermal compression-expansion process. This variant is particularly advantageous when it is desired to dissipate the energy developed under the action of a high pressure impact.

The particular organization of the capillary channels with variations of section and/or labyrinthine interconnection defines something that may be considered as being controlled "complex" topology, in contrast to the "simple" topology used in the initial assumptions described in the above-mentioned documents.

It would also be possible for the capillary passages to be coated on their surfaces with an agent selected to make them lyophobic relative to the selected liquid, e.g. an organosilicone or an organofluorine compound. This makes it possible, in particular, for the porous matrix to be made out of materials that are normally wetted by the liquid concerned: the coating has the effect of making it possible to satisfy the essential condition whereby the matrix must be lyophobic relative to the liquid.

It is also possible to provide for the matrix to include discrete particles containing a ferromagnetic substance and/or for the material of the capsule enclosing said matrix to contain ferromagnetic substances. This makes it possible to exert an influence on the heterogeneous structure by means of a magnetic field, e.g. to displace said heterogeneous structure inside a closed sealed enclosure.

The porous capillary matrix is not necessarily implemented in monolithic form. In particular, it is possible to provide for the matrix to be made in the form of discrete particles co-operating with the liquid to form a suspension or a colloidal solution.

Preferably, the material constituting the porous capillary matrix is selected from the group constituted by: silica gels; compounds of silica and of chromium, aluminosilicates; alumina; porous glasses; and graphite; and the associated liquid is selected from the group constituted by: salts, fluxes, liquid metals and alloys thereof, low temperature eutectics, mercury, low melting point Wood's metal alloys, aqueous solutions, and polar solutions (e.g. electrolytes).

It is also possible to provide for the heterogeneous structure to be encapsulated in a flexible enclosure or the like protecting it from any contact with a different external liquid used in the thermodynamic system or device concerned.

The invention also provides methods of using a heterogeneous structure having at least one of the above-specified characteristics.

Firstly, the invention provides a method of accumulating energy, characterized in that at least one heterogeneous structure is placed in a closed chamber, the lyophobic matrix of the heterogeneous structure being non-monoporous and constituted by a mixture of different matrices, and said structure is subjected to forced compression at predetermined constant temperature to force the liquid of said structure into the capillary passages of its porous solid matrix, thereby increasing the area of the liquid/solid separation surface, the energy accumulated during such forced compression being subsequently recoverable by spontaneous isothermal expansion to perform useful work.

In a particular case, the energy input during forced compression is essentially mechanical energy, and the constant temperature is selected to be less than half the critical temperature of the liquid of the heterogeneous structure, but more than the melting temperature of said liquid, the energy subsequently recovered during spontaneous isothermal expansion being mainly mechanical energy. In another particular case, the energy input during the forced compression is essentially thermal energy, and the constant temperature is selected to lie in the range 0.5 times to 1.0 times the critical temperature of the liquid of the heterogeneous structure, the energy subsequently recovered during spontaneous isothermal expansion being mainly thermal energy.

It is also possible to provide for the accumulated energy to be stored at the end of the forced compression stage by cooling the heterogeneous structure to a temperature below the melting temperature of the liquid of said structure, prior to being released at the desired moment merely by heating said structure to a temperature above the above-mentioned melting temperature.

The invention also provides a device for implementing the above method, which device includes a closed chamber of variable volume in which at least one heterogeneous structure is received, said chamber being defined by a sliding piston or by a flexible membrane or the like.

The invention also provides a method of dissipating energy, characterized in that at least one heterogeneous structure is disposed in a closed chamber, with the lyophobic matrix of the heterogeneous structure being optionally monoporous, and said structure is subjected to high compression by an impact so as to force the liquid of said structure into the capillary passages of its porous solid matrix, thereby increasing the area of the solid/liquid separation surface, after which the structure is allowed to expand spontaneously at a predetermined low pressure.

The invention also provides a device for implementing the above method, which device includes a closed chamber of variable volume in which at least one heterogeneous structure is received, said chamber being defined by a sliding piston whose rod is directed in the direction of the expected impact.

BRIEF DESCRIPTION OF THE DRAWINGS

Other characteristics and advantages of the invention appear more clearly in the light of the following description and the accompanying drawings, relating to particular embodiments, and given with reference to the figures in which:

FIG. 1 shows a heterogeneous structure of the invention subjected to isothermal compression in which the solid/liquid separation surface varies by increasing from an initial situation a) to a final situation b);

FIG. 2 shows various implementations of a porous capillary matrix of controlled complex topology in accordance with the invention, variants a), b), c), and d) corresponding to solid blocks having capillary passages through the mass thereof, and variant e) corresponding to discrete particles (whose capillary passages are not visible) co-operating with the liquid to form a suspension or a colloidal solution;

FIG. 3 is a diagrammatic section through an isolated capillary passage prior to forced penetration of the liquid at a) and after forced penetration of the liquid at b);

FIG. 4a is a diagram illustrating isothermal compression implemented with a heterogeneous structure having a monoporous matrix;

FIG. 4b is a diagram showing three characteristic curves corresponding to capillary matrix heterogeneous structures of porous glass where the associated liquid is constituted by mercury, the matrix being non-monoporous;

FIG. 5 is a graph showing the importance of the temperature selected for isothermal compression relative to a threshold corresponding to half the critical temperature of the liquid of the heterogeneous structure, when accumulating energy that is essentially either mechanical or else thermal;

FIGS. 6 to 9 show various energy accumulators, with FIGS. 7 to 9 encapsulating a heterogeneous structure of the invention in an envelope that is flexible or deformable;

FIG. 10 is a diagram showing one way of accumulating mechanical energy at constant temperature, with energy accumulated at a) being subsequently released at b) (possibly after being stored for some time);

FIG. 11 shows a device for accumulating mechanical energy that implements the principles shown in FIG. 10 over a certain temperature range (lying between the melting temperature of the liquid of the heterogeneous structure and one-half the critical temperature of said liquid);

FIG. 12 shows another device for accumulating energy, this thermal heat energy, using a heterogeneous structure of the invention, and over a temperature range that differs from that of the FIG. 11 device (temperatures lying in the range 0.5 times to 1.0 times the critical temperature of the liquid of the heterogeneous structure);

FIG. 13 is a diagram showing the greater or lesser amount of hysteresis obtained depending on the particular complex topology adopted for the capillary porosity of the matrix of the heterogeneous structure, with this being particularly important in the context of dissipating energy, and FIG. 14 is a diagram showing how energy disappears without being transformed into heat ("energy black hole");

FIG. 15 shows a device for dissipating energy, e.g. a shock absorber, in which a heterogeneous structure of the invention is housed;

FIGS. 16 and 17 are two compression-expansion diagrams obtained using a particular heterogeneous structure whose capillary matrix is a block of porous glass having micropores, and in which the liquid is a Wood's metal alloy having a low melting point; and FIGS. 18 to 20 are graphs illustrating the characteristics obtained with an anti-shimmy damper for an aircraft in which the working chamber is filled with a particular heterogeneous structure whose capillary matrix is porous silica gel and whose liquid is water.

MORE DETAILED DESCRIPTION

FIG. 1 is a diagram of a heterogeneous structure 10 of the invention for accumulating or dissipating energy and intended for use in thermodynamic systems or devices.

The heterogeneous structure 10 is essentially constituted by a porous capillary solid matrix 11 and by a liquid 13 surrounding said porous capillary matrix, which matrix is lyophobic relative to said liquid, i.e. the surface tension is such that the liquid is non-wetting when it comes into contact with the surface of the matrix. The porous capillary matrix 11 has open capillary porosity of controlled complex topology, which complex topology defines the displacement paths for the liquid. The pores are referenced 12 in the diagram of FIG. 1, and they are defined by capillary passages having changes of section and/or interconnected to one another to form labyrinths. The liquid 13 surrounding the porous capillary matrix 11 is selected to define a solid/liquid separation surface of area which varies isothermally and reversibly as a function of the external pressure to which the structure is subjected. The liquid 13 surrounding the porous capillary matrix 11 that is lyophobic relative to said liquid therefore cannot penetrate spontaneously into the pores or capillaries, and such penetration can only be forced due to appropriate compression being exerted on the heterogeneous structure.

As shown in FIG. 1, the porous capillary matrix 11 is made in the form of discrete particles having open porosity, which particles are in suspension in the surrounding liquid 13 associated with said matrix. However, it is explained below that the porous capillary solid matrix can also be made in the form of a block likewise having capillary passages in its mass, which passages are organized with the above-mentioned complex topology, with this being described below with reference to FIG. 2.

In FIG. 1, to go from the situation shown in a) to the situation shown in b) sufficient compression (symbolized by radial arrows) is exerted on the heterogeneous structure 10 to force the liquid to penetrate into the capillary network of the solid matrix of said heterogeneous structure, and said compression is isothermal. This forced compression is represented diagrammatically in FIG. 3, in which there can be seen a situation a) in which the liquid 13 is present at the entrance to a capillary passage 12 formed in the porous capillary solid matrix 11, but without being able to penetrate into this channel, so that the liquid frontier is constituted by a meniscus 15. In situation b), because of the isothermal compression applied to the heterogeneous structure, the liquid has been forced to penetrate into the capillary passage 12. The pressure threshold that needs to be crossed corresponds to the Laplace-Young capillary pressure whose value is given by the equation $P=(2\sigma.\cos\theta)/r$, where $\sigma$ is the surface tension of the liquid of the heterogeneous structure at the temperature under consideration, $\theta$ is the contact angle (said angle being necessarily greater than 90° because of the above-specified lyophobic characteristic), and r is the radius of the capillary channel. The effect of going from situation a) to situation b) in FIG. 3 is to increase the area of the liquid/solid separation surface, which can be written $\Omega$, with the change $\Delta\Omega$ corresponding to the area of the walls of the capillary passages concerned. Thus, the solid/liquid separation surface area varies isothermally and reversibly as a function of the external pressure to which the heterogeneous structure is subjected, thereby enabling useful work to be developed. When the pressure applied to the heterogeneous structure is released, spontaneous expansion is thus obtained enabling a return from situation b) to situation a). It is of interest to observe that the flow of liquid within the capillary pores of the lyophobic solid matrix is infra-laminar, i.e. its Reynolds number is substantially zero, such that the transition from one situation to the other takes place without friction, and thus without heating. This result constitutes an element of major importance in the applications that can be envisaged for the heterogeneous structure of the invention.

In FIG. 2, there can be seen various embodiments of the porous capillary matrix of controlled complex topology of the heterogeneous structure.

At a), the matrix 11.1 is made in the form of a block having capillary passages 12.1 through the bulk thereof and opening out via pores, these passages being made in the form of parallel channels extending in two perpendicular directions. The channels 12.1 are of constant section in this case, and they are interconnected to one another to form a labyrinthine network.

At b), the embodiment shown relates to a matrix 11.2 that is likewise in the form of a block, but in which the capillary passages 12.2 are implemented as slots likewise of constant section and mutually interconnected.

The embodiments shown at a) and b), or in a variant with capillary passages that are slightly curved, have the effect of providing a structure whose hysteresis is low when subjected to an isothermal compression-expansion process. The question of hysteresis is discussed below when describing FIG. 13, since such hysteresis is of particular importance in the context of seeking energy dissipation.

At c) there can be seen a porous capillary matrix 11.3 constituted by a block having channels 12.3 of varying section. Specifically, the channels are constituted by alternating small capillaries and microspheres disposed in series. The changes in section are selected to be small (i.e. with a ratio that is much less than 2 between the maximum section and the minimum section) if the heterogeneous structure is intended above all to accumulate energy, and to be large (ratio not less than 2 between the maximum section and the minimum section, and if possible much greater than 2) if the heterogeneous structure is intended above all to dissipate energy.

At d), there can be seen a matrix 11.4 having capillary passages 12.4 organized in the form of intersecting channels, so as to form labyrinths. These channels are shown as being of constant section, however it would naturally be possible to combine the embodiments c) and d) so that the channels are both mutually interconnected to form labyrinths and subject to variations in section.

Compared with the embodiments shown at a) and b), the embodiments shown at c) and d) have high hysteresis when the structure is subjected to an isothermal compression-expansion process.

At e) there can be seen a solid matrix 11.5 implemented in the form of discrete particles having capillary porosity, co-operating with the liquid 13 to form a suspension or a colloidal solution. The organization of the capillary channels in these particles may individually be of controlled complex topology, which cannot be seen in this figure. On the left, the discrete particles are clumped together which corresponds to a minimum liquid/solid separation surface area insofar as the surrounding liquid 13 cannot spontaneously reach the capillary porosity of the matrix. By exerting sufficient external compression, the liquid 13 is forced into the capillary pores of the matrix, thus having the effect of increasing the liquid/solid separation surface area, said separation surface area varying isothermally and reversibly.

In some cases, the starting material from which the porous matrix is made is a material that can be wetted by the selected liquid. In which case, it is appropriate to modify the matrix so as to satisfy the essential condition whereby said matrix must be lyophobic relative to the liquid concerned. In this case, the capillary passages of the matrix made of a material that is normally wetted by the liquid concerned are themselves coated on their surfaces by an agent that is selected to make their surfaces non-wettable by the liquid 13. In FIG. 3, reference 14 designates the surface of a capillary passage 12 that could be chemically coated with an agent selected to make said surface non-wettable by the liquid. For this purpose, it is possible to use organosilicone or organofluorine compounds.

In another particular embodiment, provision may be made for the block constituting the matrix 11 to include discrete particles containing a ferromagnetic substance. This makes it possible to exert a determined influence on the block constituting the porous matrix, and that can be of particular advantage when it is desired to move the heterogeneous structure so as to change it position inside a sealed leakproof enclosure that is not to be opened.

The material constituting the porous capillary matrix 11 could, for example, be a silica gel, a compound of silica and chromium, an aluminosilicate, alumina, a porous sodium-borosilicate glass, or graphite. The associated liquid can be then be a salt, a flux, an electrolyte, a liquid metal or a liquid metal alloy, a low temperature eutectic (e.g. gallium-indium, or gallium-indium-lead, or indeed gallium-lead-tin), mercury, an aqueous solution, a polar solution (antifreeze, electrolyte), or indeed a Wood's metal or other low-melting point alloy. It is recalled that Wood's metal is a eutectic alloy whose melting point is 95° C., with such an alloy often being used for flow soldering electronic components. As an indication, mention can be made of the following solid/liquid "couples" which are particularly appropriate: silica-gel/mercury; aluminosilicates/Wood's metal; silochrome/gallium; and paraffin/water.

FIG. 4a is a diagram of pressure as a function of volume and illustrating an isothermal compression process applied to a heterogeneous structure having a monoporous matrix. Between points 1 and 2 of the curve, the heterogeneous structure behaves like a quasi-condensed system, insofar as its volume varies very little, after which, when a threshold pressure is reached (which threshold pressure is written $P_L$ since it is the Laplace-Young capillary pressure), the length connecting point 2 to point 3 and corresponding to a significant change of volume $\Delta V$ is constituted by a horizontal straight line, i.e. it takes place at constant pressure. At point 3, the capillary porosity has been filled, such that between points 3 and 4 the system is again quasi-condensed. It is of interest to observe that an isobaric-isothermal compression process is obtained without a phase transition. This is obtained by means of the porous capillary matrix and the associated liquid, said matrix being lyophobic relative to the liquid, while the composition of the liquid is not modified during the isothermal compression process, the surface tension of said liquid being a function of temperature, only. The work involved in the isobaric-isothermal compression of the heterogeneous structure is given by multiplying the pressure P by the change in volume $\Delta V$. It is of interest to observe that this is proportional to pressure, unlike conventional thermodynamic systems using gases or steam in which the work of isothermal pressure is proportional to the logarithm of the pressure. This explains why a capacity to accumulate energy is obtained that is at least six to eight times greater than the capacity that is obtained with gas or steam at a comparable maximum pressure. It is also of interest to observe that the forced increase in the liquid/solid separation surface area and the spontaneous decrease of said separation surface area take place without there being any splitting of the liquid, i.e. without turbulence and without cavitation: thus obtaining the advantage of a heterogeneous structure of the above-specified type generating substantially no noise in use.

As already mentioned above, FIG. 4a shows clearly the isobaric-isothermal phenomenon of the process whereby the monoporous matrix heterogeneous structure is compressed (i.e. a matrix in which the pores have a single dimension, i.e. r=constant or $\partial r/\partial V=0$). The isothermal phenomenon is due, in fact, to the conditions of the experiment (T=constant), whereas the isobaric phenomenon is a result of the way in which the Laplace-Young capillary pressure is defined: when the system operates with T=constant, then necessarily σ=constant, thus giving rise always to P=constant because of the monoporous nature of the matrix used (r is constant so $\partial r/\partial V=0$).

Nevertheless, heterogeneous structures can be used to obtain a wide range of characteristics on the diagram giving P as a function of V.

FIG. 4b thus shows the different characteristics of heterogeneous structures implemented with matrices of porous glass and an associated liquid which is mercury. The matrices are thus not monoporous, i.e. r varies, thus $\partial r/\partial V \neq 0$. With a non-porous matrix made up of a mixture of different matrices, it is possible to make effective use of the heterogeneous structure of the invention to accumulate energy, in accordance with one of the aspects of the invention. The curves 1, 2, and 3 in FIG. 4b show different cases obtained by mixing different types of matrix (in powder form, in pellet form) e.g. five to ten different matrices, and by varying the partial volume $V_i$ of each of the matrices, and their radii $r_i$=constant:

quasi-convex curve 1 corresponds to a major proportion of matrix partial volumes $V_i$ for which $r_i$ is minimal (and thus P maximal) relative to the volumes $V_j$ of matrices for which $r_j$ is maximal (and thus P minimal), and it can be seen that this heterogeneous structure is compressed for the most part at high pressures;

quasi-concave curve 2 corresponds, inversely, to a major proportion of matrix partial volumes $V_i$ for which $r_i$ is maximal (and thus P minimal) relative to matrix volumes $V_j$ for which $r_j$ is minimal (and thus P maximal), and it can be seen that this heterogeneous structure is compressed for the most part at low pressures; and quasi-linear curve 3 corresponds to a balanced proportion with a balanced volume distribution for the partial volumes of the matrices having pores and capillaries of different sizes.

As described below, it is possible to provide for the heterogeneous structure to be encapsulated in an envelope that is flexible or the like, protecting it from any contact with an external liquid other than that used in the thermodynamic system or device concerned.

In FIG. 6, there can be seen an energy accumulator 20 enclosing a heterogeneous structure 10 of the above-described type, for a case in which the hydraulic fluid concerned passing through a tube 23 is suitable for use as the non-wetting liquid in the heterogeneous structure concerned. In this case there is no need to encapsulate the heterogeneous structure. Thus, there can be seen a case 21 made up of two portions which are assembled together in leakproof manner with an associated gasket 22, the heterogeneous structure received inside the case 21 including a lyophobic capillary porous matrix 11 which is represented in this case as being in the form of a plurality of individual sections, which are not wetted by the associated liquid 13 passing along the tube 23. For example, the hydraulic system may be one in which the driving fluid periodically has too much or too little energy.

In other cases, it may be necessary to avoid any contact between the heterogeneous structure and the working hydraulic fluid. Under such circumstances, the heterogeneous structure is encapsulated or encased in the manner shown in the variants of FIGS. 7 to 9.

Thus, FIG. 7 shows an energy accumulator 24 constituted by a rigid outer envelope 21 made up of two portions clamped onto a separator membrane 25 constituting a flexible diaphragm. The heterogeneous structure 10 is received in the chamber defined by the flexible diaphragm, and is thus isolated from any contact with the hydraulic fluid 26 passing along the tube 23. In this case, a heterogeneous structure is shown of the type constituted by discrete particles 11 having open capillary porosity 12 of controlled complex topology and forming a suspension in the liquid 13.

FIG. 8 shows another energy accumulator 27 including, as before, a rigid envelope 21 whose chamber receiving the heterogeneous structure is to be isolated from the hydraulic fluid 26 concerned passing along the tube 23. As a replacement for the above flexible diaphragm, a grid 28 is provided in this case having a mesh whose orifices 29 are small enough to prevent the capsules including the heterogeneous structure 10 from passing through. In FIG. 8, the capsules containing the porous matrix heterogeneous structure 11 having open capillary channels 12 with controlled complex topology are shown as being larger (in the form of "lumps") and they are surrounded with the associated liquid 13 relative to which the matrix is lyophobic. In this case, the heterogeneous structure is held captive in a capsule of diameter greater than that of the orifices 29. Capsules can be used that are made of plastics material, of polymer material, or of metal, thereby isolating the fluid 26 of the heterogeneous structure confined in the rigid envelope 21. It would optionally be possible to incorporate magnetic particles in the envelope material constituting each "lump".

Leakproof encapsulation can also be provided by confining the heterogeneous structure of the invention in metal bellows, as illustrated in FIG. 9. There can be seen three bellows 31, with the inside volume of each being occupied by a heterogeneous structure 10 of the invention, the three bellows 31 being received in a leakproof case 32 through which there passes hydraulic working fluid 26 coming from the tube 23.

When the heterogeneous structure is encapsulated, it is preferable to perform vacuum treatment so as to remove any air, since such air would otherwise constitute a material that presents no advantage with respect to energy.

FIG. 10 shows a method of accumulating mechanical energy at constant temperature, using a heterogeneous structure of the type in accordance with the invention, and received in a closed chamber of a piston-and-cylinder system. There can thus be seen a device 40 including a cylinder 41 in which there slides a piston 42 whose rod is referenced 43. The annular chamber is referenced 44 while the full section chamber is referenced 45. In the full section chamber, there is a heterogeneous structure 10 having a porous capillary matrix of controlled complex topology and that is lyophobic relative to the associated liquid. At a), the diagrammatic figure symbolizes the lyophobic pores in which the liquid is contained on compression, whereas at b) there can be seen the result of the liquid leaving the pores and of spontaneous expansion. While the heterogeneous structure is being compressed, liquid is forced into the capillary passages of the solid matrix of the structure, at constant temperature, with this having the effect of increasing the solid/liquid separation surface area ($\Delta\Omega>0$) and of increasing the Gibbs potential of the system ($\Delta G>0$). Thus, at a), there is forced extension of the separation surface area ($\Delta\Omega>0$), whereas the pressure is released the separation surface area decreases ($\Delta\Omega<0$) as does the Gibbs potential ($\Delta G<0$). The energy accumulated during the forced compression can thus be recovered by spontaneous isothermal expansion to perform useful work. The useful work is represented by breaking a bar 46 against which the end of the piston rod 43 presses. In this case, the energy input during forced compression is essentially mechanical. Provision is also made for the constant temperature at which compression takes place to be selected lower than half the critical temperature of the liquid of the heterogeneous structure, while still being greater than the melting temperature of said liquid. Under such circumstances, the energy subsequently recovered during spontaneous isothermal expansion is essentially mechanical energy.

FIG. 11 shows a device 50 implementing the technique described above with reference to FIG. 10 for accumulating mechanical energy.

There can be seen a cylinder-and-piston system comprising a cylinder 51 in which there slides a piston 52 whose piston rod is referenced 53. The annular chamber is referenced 54 while the full section chamber is referenced 55. In this chamber, there is received a heterogeneous structure 10 of the invention, which structure is encased on this occasion in an envelope 33 which is sufficiently flexible to transmit pressure forces while avoiding contact with the hydraulic fluid present in the chamber 55. Arrow A corresponds to the loading direction while arrow B to the unloading direction. A valve 59 is provided for putting the chambers 54 and 55 of the cylinder into communication with each other via a variable constriction. A slide valve 56 serves to connect said system either to a hydraulic source constituted by a pump 57.1 and its associated reservoir 58.1, or else to energy-consuming means constituted by a hydraulic motor 57.2 whose associated reservoir is referenced 58.2. It suffices to act on the slide valve 56 selecting the lefthand position for loading purposes or the righthand position for unloading purposes, and the neutral position for cutoff. Such a device 50 can operate in various modes:

- the accumulator can be loaded and unloaded via the piston rod: on loading, the valve 56 is in its neutral position and the heterogeneous structure is compressed, it being possible to lock the piston in its maximum penetration position by closing the constriction valve 59; when the valve 59 is opened again, the accumulated energy is released and the piston rod can perform useful work, it being understood that the stroke of the piston can be interrupted at any time by reclosing the valve 59;
- the accumulator can be loaded and unloaded hydraulically: prior to loading, the slide valve 56 is put in its far right position, so that the pump 57.1 compresses the heterogeneous structure, after which the slide valve is returned to its neutral position; the accumulated energy can be released by putting the slide valve into its far left position, with the useful work being performed by the hydraulic motor 57.2; and
- the accumulator can be loaded and unloaded in combined mechanical and hydraulic manner: the above mode is modified by opening the constriction valve 59 after the slide valve 56 has been returned to its neutral position, thereby recovering useful work via the piston rod.

The heterogeneous structure is thus received in a closed chamber of variable volume which is defined by a sliding piston. Naturally, in a variant, it would have been possible to use a device of the type shown in FIGS. 7 or 8, using a flexible membrane 25 or a grid 28.

In a variant of the above technique, provision may be made for the energy input during forced compression of the heterogeneous structure to be essentially thermal. Under such circumstances, it turns out that the constant temperature needs to be selected to lie in the range 0.5 times to 1.0 times the critical temperature $T_c$ of the liquid in the heterogeneous structure (in accordance with the explanations given below with reference to FIG. 5). The energy that is subsequently recovered during spontaneous isothermal expansion is then mainly thermal energy.

In FIG. 12, there can be seen a thermal energy accumulator implementing the method of the invention. There can thus be seen a device 60 comprising a cylinder 61 in which there slides a piston 62 whose rod is referenced 63. References 64 and 65 are used for the annular chamber and for the full section chamber respectively of the cylinder, with the heterogeneous structure 10 being received in the full section chamber. In this case, a heat-conveying fluid circulates around all of the cylinder 61, with the entire structure being received in a thermally insulating enclosure 66. The inlet duct 68 includes a slide valve 69 enabling said duct to be connected either to a source of cold fluid 71, or to a source of hot fluid 72. A pawl 67 is also shown for enabling the piston to be locked in place at the end of an isothermal compression stage, thereby enabling the accumulated energy to be stored. When it is desired to recover said energy, it suffices to release the pawl 67, thereby enabling liquid to be expelled spontaneously from the capillary porous structure of the matrix. The useful outlet from the thermal accumulator is referenced 70.

For isothermal compression, the latent heat of the surface area formation comes from outside via the agent heating the source 72. A small amount of mechanical energy applied to the rod 63 is thus input, together with a large amount of thermal energy coming from the heating agent. During compression, the slide valve 69 is in its far left position or its far right position, thereby accumulating thermal energy insofar as the temperature selected for the heating agent exceeds 0.5 times the critical temperature $T_c$ of the liquid in the heterogeneous structure. The higher the temperature selected for this purpose, the greater the change in separation surface area, and thus the greater the capacity of the heterogeneous structure for accumulating energy. By moving the slide valve 69 to its extreme right position, the previously accumulated thermal energy is transferred, and the pawl 67 is released so as to allow the piston to move spontaneously to the right under drive from the pressure exerted by the liquid of the heterogeneous structure escaping from the pores and the capillaries. The separation surface area contracts spontaneously, thereby increasing the internal energy of the agent heating the source 71, because the latent heat of surface area formation is released during contraction of said separation surface area.

The diagram of FIG. 5 shows how the relationship between the mechanical and the thermal components of the internal energy vary as a function of temperature, or more precisely it shows the ratio between the selected constant temperature and the critical temperature $T_c$ of the liquid of the heterogeneous structure. This diagram shows a point A corresponding to the mechanical and thermal components being equal, with this happening when the temperature is equal to one-half the above-specified critical temperature ($0.5 \times T_c$). At temperatures T1 greater than this limit, the process obtained is essentially a process of accumulating thermal energy, whereas for temperatures T2 lower than said limit, the process obtained is essentially one of accumulating mechanical energy.

Where necessary, it is possible to provide for the accumulated energy to be stored after the forced compression stage for a determined length of time by cooling the heterogeneous structure to a temperature below the melting temperature of the liquid in said structure, with the energy subsequently being released when required merely by heating said structure to a temperature that is greater than the above-mentioned melting temperature.

The diagram of FIG. 13 represents a plurality of isothermal compression-expansion cycles, with four cycles giving return straight lines on expansion referenced C1, C2, C3, and C4 each corresponding to a different constant pressure value. On the line C1, the difference from isothermal compression is small (e.g. close to 5%), and this is obtained by means of a porous capillary matrix topology that gives low hysteresis in the isothermal compression-expansion process for the heterogeneous structure. In contrast, the straight line C4 corresponds to maximum hysteresis, and that is particularly advantageous for dissipating energy.

FIG. 14 shows two different cycles D1 and D2 of isothermal compression, with the abscissa plotting the filling ratio of the controlled complex topology capillary porosity of the heterogeneous structure matrix by the associated liquid with respect to which the matrix is lyophobic. From this diagram, it can be seen that the forced compression enables all of the input energy to be absorbed, with the system remaining in a compressed state without expanding. This arises only when high hysteresis is available. Under such circumstances, the heterogeneous structure is genuinely stable in the compressed state.

By way of example, FIGS. 18 to 20 show the characteristics obtained in tests performed on a vibration damper (for "anti-shimmy" purposes) for a heavy transport aircraft, which damper includes a heterogeneous structure of the invention.

More precisely, the damper concerned comprises a cylinder and two pistons with oppositely directed piston rods, the space defined between the two pistons whose displacements are guided by the walls of the cylinder forming a working chamber: this working chamber receives a special heterogeneous structure whose matrix is made of porous silica gel that has been modified to make it lyophobic relative to or gallosilicone substances, and an associated liquid relative to which the matrix is thus lyophobic, which liquid is constituted in this case by water containing antifreeze.

Such a damper fitted with a heterogeneous structure has been subjected to sinusoidal excitation (at a frequency close to 20 Hz) applied to the end points of the rods associated with the pistons. The diameter of the pistons was 30 mm, and the maximum stroke of each piston (together with its rod) was 8.5 mm.

The resulting force/stroke diagram is given in FIG. 18 and it shows that the heterogeneous structure provides high performance in absorbing shimmy vibration energy. A quasi-static characteristic is thus obtained for the damper. By varying the displacement speed over the range 1.8 mm/minute to 48 mm/minute, it was possible to observe that all of the characteristics measured at different speeds coincided.

The diagram of FIG. 19 shows energy absorbed as a function of stroke during a quasi-static cycle, and it shows specifically that above a displacement of about 2 mm, the energy absorbed varies linearly as a function of the stroke of the piston.

The diagram of FIG. 20 shows the energy absorbed as a function of the applied frequency, and it shows that the amount of energy absorbed is substantially independent of frequency. The frequency passband can be seen to be broad enough for the energies and the forces under consideration.

FIG. 15 shows an energy dissipater device 80 making use of a heterogeneous structure of the above-specified type. A typical field of application is constituted by a shock absorber. The device 80 thus comprises a case 81 that is rigidly secured to the object 82 that is to be protected, and it is closed by an endpiece 83 in which there slides a piston rod 84 in sealed manner through gaskets 87. An internal abutment is provided, referenced 89. A heterogeneous structure 10 is located inside the case 81 and can be implemented in the form of a flexible envelope that is permeable to the surrounding liquid and that contains particles of powder constituting the lyophobic capillary porous matrix, or in a variant, a capillary structure 86 (forming the lyophobic matrix 11 of the heterogeneous structure), disposed circumferentially inside the case 81, together with a chamber full of liquid 85 (forming the liquid 13 associated with the heterogeneous structure). For a flexible envelope, hydraulically penetratable support inserts 88 may be provided.

Under such circumstances, a closed chamber 85 is made available containing at least one heterogeneous structure having a porous capillary matrix that is lyophobic and of controlled complex topology, and said structure is subjected to high compression by an impact, which impact is symbolized by arrow F exerted on the end of the piston rod 84. This forces the liquid of the heterogeneous structure into the capillary passages of its porous matrix, thereby increasing the solid/liquid separation surface area, after which the structure can be allowed to expand spontaneously at a predetermined low pressure. It will be observed that the piston rod 84 is directed in the direction of the expected impact.

Finally, two particular embodiments of the invention are described with reference to the isothermal compression-expansion diagram (giving pressure P in MPa as a function of $\Delta V/V$) obtained using a particular heterogeneous structure whose capillary matrix was a block of porous glass having micropores, having controlled complex topology, and associated with a liquid constituted by a low melting point (95° C.) Wood's metal. By way of indication, the size of the micropores was about $2 \times 10^{-8}$ m.

In FIG. 16, there can be seen a curve F which is the compression curve at ambient temperature (22° C.) of the solid/liquid matrix assembly in the solidified state.

The assembly was initially heated to a temperature of 95° C. which is the melting point of the Wood's metal. The heterogeneous structure was then compressed thus passing through points 2, 3, 4, and 5 on the curve E1 shown. Thereafter the pressure was reduced a little to a value slightly higher than the Laplace-Young pressure, thus reaching point A, after which the assembly was cooled back down to ambient temperature such that the liquid solidified thus making it suitable for long term storage. On reheating the assembly to the melting temperature of the solidified liquid, the expansion cycle was enabled to restart from point A, passing through points 6, 7, and 8. Point 8 coincides with starting point 2, insofar as the process is reversible, as was the case.

FIG. 17 shows a variant of the above diagram, with a curve E2, where, at the end of the compression cycle, the pressure was lowered to less than the Laplace-Young pressure. The device was cooled so it solidified, and was capable of remaining in the solid state for an extremely long period of time. When the temperature of the sample was raised to the melting temperature of the Wood's metal, the system was released and it performed mechanical work with a large amount of force over a long stroke (points B, 6, 7, and 8).

Such energy storage has numerous applications, and by way of example, mention can be made of deploying solar panels on satellites, or making automatic safety systems that are completely self-contained with respect to energy requirements.

In particular, in the light of the diagrams of FIGS. 16 and 17, it can be seen that the heterogeneous structure of the invention possesses properties comparable to those of so-called "shape memory" materials. However, whereas traditional shape memory consists in passing from the martensitic state to the austenitic state, in the present case there is a change in contact surface area (or separation surface area) under external force, and subsequently energy is released spontaneously (reducing contact surface area) and can be recovered to perform useful mechanical work. In addition, the heterogeneous structure of the invention possesses significant advantages over traditional shape memory materials (e.g. Ti—Ni, copper alloys) insofar as the forces and the expansion strokes that can be obtained are much larger with the heterogeneous structure of the invention. By way of comparison, the expansion of conventional shape memory materials lies in the range 2% to 8% whereas values in the range 40% to 80% are obtained with a heterogeneous structure of the invention. The force developed by the heterogeneous structure can also take on huge values (several thousands to several millions of Newtons (N)), whereas Ti—Ni alloys are hardly capable of exceeding 10 N to 100 N.

The invention is not limited to the embodiments described above, but on the contrary it covers any variant using equivalent means to reproduce the essential characteristics specified above.

I claim:

1. A heterogeneous structure for accumulating or dissipating energy for use in thermodynamic systems or devices, the structure being of the type comprising a porous capillary solid matrix and a liquid surrounding said matrix, said matrix being lyophobic relative to said liquid, wherein the porous capillary solid matrix has an open capillary porosity of complex topology, with capillary passages that are of varying section, and wherein the liquid surrounding the porous capillary matrix is selected to define a solid/liquid separation surface whose area varies isothermally and reversibly as a function of the external pressure to which the structure is subjected.

2. A heterogeneous structure for accumulating or dissipating energy for use in thermodynamic systems or devices, the structure being of the type comprising a porous capillary solid matrix and a liquid surrounding said matrix, said matrix being lyophobic relative to said liquid, wherein the porous capillary solid matrix has an open capillary porosity of complex topology, with capillary passages that are mutually interconnected to form labyrinths, and wherein the liquid surrounding the porous capillary matrix is selected to define a solid/liquid separation surface whose area varies isothermally and reversibly as a function of the external pressure to which the structure is subjected.

3. A heterogeneous structure for accumulating or dissipating energy for use in thermodynamic systems or devices, the structure being of the type comprising a porous capillary solid matrix and a liquid surrounding said matrix, said matrix being lyophobic relative to said liquid, wherein the porous capillary solid matrix has an open capillary porosity of complex topology, with capillary passages that are of varying section and mutually interconnected to form labyrinths, and wherein the liquid surrounding the porous capillary matrix is selected to define a solid/liquid separation surface whose area varies isothermally and reversibly as a function of the external pressure to which the structure is subjected.

4. A structure according to claim 2, wherein the mutually interconnected capillary passages are organized to form cylindrical channels, slightly curved capillaries, or slots, so as to present low hysteresis when the structure is subjected to an isothermal compression-expansion process.

5. A structure according to claim 1, wherein the capillary passages of varying section, and are organized in the form of intersecting channels, or of channels comprising alternating microspheres and neck portions, thereby presenting high hysteresis when the structure is subjected to an isothermal compression-expansion process.

6. A structure according to any one of claims 1, 2 and 3, wherein the capillary passages are coated on their surfaces with an agent selected to make them lyophobic relative to the selected liquid, said agent being selected from the group consisting of an organosilicone and an organofluorine compound.

7. A structure according to any one of claims 1, 2 and 3, wherein the matrix includes discrete particles containing a ferromagnetic substance.

8. A structure according to claim 3, wherein the matrix is made in the form of discrete particles co-operating with the liquid to form a suspension or a colloidal solution.

9. A structure according to any one of claims 1, 2 and 3, wherein the material constituting the porous capillary matrix (11) is selected from the group constituted by: silica gels; compounds of silica and of chromium, aluminosilicates; alumina; porous glasses; and graphite; and the associated liquid (13) is selected from the group constituted by: salts, fluxes, liquid metals and alloys thereof, low temperature eutectics, mercury, low melting point Wood's metal alloys, aqueous solutions, and polar solutions.

10. A structure according to any one of claims 1, 2 and 3, wherein it is encapsulated in a flexible enclosure protecting it from any contact with a different external liquid used in the thermodynamic system or device concerned.

11. A method of using a heteogeneous structure according to any one of claims 1, 2 and 3 for the purpose of accumulating energy, the method comprising placing at least one heterogeneous structure in a closed chamber, the lyophobic matrix of the heterogeneous structure being non-monoporous and constituted by a mixture of different matrices, and subjecting said structure to forced compression at predetermined constant temperature to force the liquid of said structure into the capillary passages of its porous solid matrix, thereby increasing the area of the liquid/solid separation surface, the energy accumulated during such forced compression being subsequently recoverable by spontaneous isothermal expansion to perform useful work.

12. A method according to claim 11, wherein the energy input during forced compression is essentially mechanical energy, and the constant temperature is selected to be less than half the critical temperature of the liquid of the heterogeneous structure, but more than the melting temperature of said liquid, the energy subsequently recovered during spontaneous isothermal expansion being mainly mechanical energy.

13. A method according to claim 11, wherein the energy input during the forced compression is essentially thermal energy, and the constant temperature is selected to lie in the range 0.5 times to 1.0 times the critical temperature of the liquid of the heterogeneous structure, the energy subsequently recovered during spontaneous isothermal expansion being mainly thermal energy.

14. A method according to claim 11, wherein the accumulated energy is stored at the end of the forced compression stage by cooling the heterogeneous structure to a temperature below the melting temperature of the liquid of said structure, prior to being released at the desired moment merely by heating said structure to a temperature above the above-mentioned melting temperature.

15. A device for implementing the method according to claim 11, comprising it includes a closed chamber of variable volume in which at least one heterogeneous structure is received, said chamber being defined by a sliding piston or by a flexible membrane.

16. A method of using a heterogeneous structure according to any one of claims 1, 2 and 3, to dissipate energy, the method comprising disposing at least one heterogeneous structure in a closed chamber, and subjecting said structure to high compression by an impact so as to force the liquid of said structure into the capillary passages of its porous solid matrix, thereby increasing the area of the solid/liquid separation surface, after which the structure is allowed to expand spontaneously at a predetermined low pressure.

17. A device for implementing the method of claim 16, comprising a closed chamber of variable volume in which at least one heterogeneous structure is received, said chamber being defined by a sliding piston whose rod is directed in the direction of the expected impact.

18. A structure according to claim 7, wherein the matrix is enclosed in a capsule formed of a material which contains ferromagnetic substances.

19. A method according to claim 16 wherein the lyophobic matrix of the heterogeneous structure is monoporous.

* * * * *